J. L. OWENS.
Assignor to J. HARRIS.
Harvester-Rake.
No. 8,998. Reissued Dec. 16, 1879.
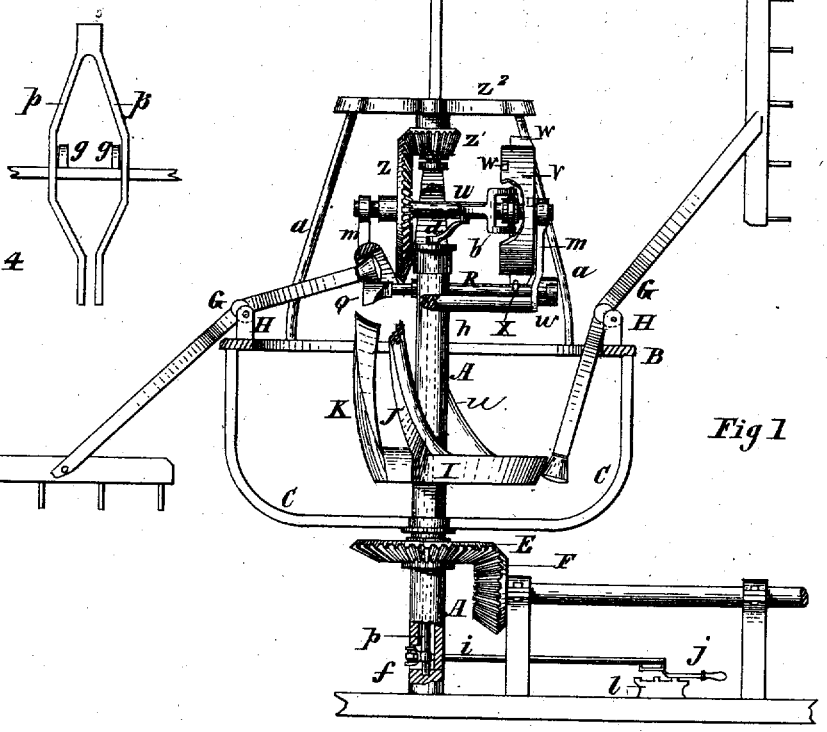
Witnesses
W. C. Corlies
Jno. C. MacGregor,
Inventor
John L. Owens
By Munn & Co.
Attorneys
N. PETERS, PHOTO-LITHOGRAPHER, WASHINGTON, D. C.

UNITED STATES PATENT OFFICE.

JOHN L. OWENS, OF CAMBRIA, WISCONSIN, ASSIGNOR TO JAMES HARRIS.

IMPROVEMENT IN HARVESTER-RAKES.

Specification forming part of Letters Patent No. 142,644, dated September 9, 1873; Reissue No. 8,998, dated December 16, 1879; application filed June 19, 1879.

*To all whom it may concern:*

Be it known that I, JOHN L. OWENS, of Cambria, in the county of Columbia and State of Wisconsin, have invented a new and useful Improvement in Harvester-Rakes, of which the following is a specification.

Figure 1 is a side elevation of my improved self-rake with a part represented in section. Figs. 2 and 3 are partial side elevations, showing the different positions of some of the devices by which the rakes are caused to work or not; and Fig. 4 is a detail, showing the construction of the rake-arms.

Similar letters of reference indicate corresponding parts.

My invention relates to certain improvements in harvester-rakes adapted to act more or less frequently, so as to make gavels of uniform size.

The improvements will be first described in connection with parts necessary to form an operative machine, and then specifically indicated in the claims.

A represents a tubular standard for supporting the rake carrying and actuating apparatus. It is mounted on the reaper in any suitable position for the rakes to work on the apron properly for raking off the gavels. It carries the large horizontal rim B by the curved arms C, which branch outward and upward from a hub, D, fitted loosely on the standard A a suitable distance above the bottom, and attached to the top of the bevel-wheel E, which also turns loosely on the standard A and carries the rim. It is turned by the driving-wheel F. The rake-arms G are pivoted to standards H on the upper side of this rim, and arranged so that the inner ends work upon the stationary cam I J K L M as they are carried around by the rim. The horizontal part I of the cam holds them up, as indicated at the right-hand side of Fig. 1, during that part of their travel in which they move after leaving the apron and before reaching it again. The part J allows the arms to rise at the inner ends and fall at the outer ends to bring the rakes down to the apron. The part K insures the swing of the rakes down to the apron. The rakes work on the apron while passing the part L, and they are lifted again by the part M. This cam is supported on the standard A a little above the hub D. In order that this cam may allow some of the rakes to pass above the grain on the apron of the machine when the grain is so light that a quantity sufficient for a gavel does not accumulate as each succeeding arm passes, I provide sufficient room between the part M of the cam and the part N for two channels, O and P, through either of which the arms can descend to the horizontal part of the cam. The one P is a little plate, Q, on a shaft, R, by which the rake-arms are caused to descend in passage P or pass along over said plate and down the channel O, as required, in the latter case to rake off the gavel. Below this plate is a short fixed partition, S, between the two passages, and below that a switch, T, which guides the arms when going down the channel O, and rises up to allow them to pass down channel P.

A weighted arm or switch, Q, on the shaft R is arranged to be closed over the channel P, to cause all the rakes to act as such and sweep the grain off from the apron or platform when it is desired they should.

The weight is arranged so as to operate to hold the switch Q open and permit the arms to pass down the channel P and cause all the rakes to be raised so as to pass over the grain on the apron or platform as long as the weight is left free to act. But for intercepting some of the rakes I have a tappet-wheel with, say, three rows of tappets, W, on its face, revolving over the shaft R, which has also a tappet, X, by means of which the shaft R is turned by a tappet on the wheel V acting upon it so as to depress the switch Q and close the channel P whenever it may be desired to have a rake sweep the apron or platform. This wheel is mounted on a shaft, U, which is geared by a wheel, Z, with a wheel, Z′, on the under side of the arms $Z^2$, which are mounted on the standards *a*, rising up from the rim B, and having a pivot extending down through said wheel into the top of the standard A. This tappet-wheel is capable of sliding lengthwise on the shaft U to bring either row or set of its tappets into action with the tappet X, according as demanded by the volume of grain, the said sets each being arranged for having a different effect in throwing out the rakes—that is, varying the order of throwing them out. It is shifted by the fork *b*, crank *d*, rod *e*, arm *f*, rod *i*, and lever *j*, the latter being arranged in a place where it can be reached conveniently by the operator to shift it at will, and provided with a holder, *l*, by which it can be held in either of three positions corresponding to three sets of tappets on the wheel V.

The shaft is mounted in standards *m*, one of which is on the top of part L of the cam, and the other on the horizontal platform *n*, attached to the standard A and to the cam.

In order to make the rake-arms strong and pivot them to the rim B substantially, I propose to make them of two members, *p*, bent and connected together, as shown in Fig. 4, and pivoted to independent standards *g* on the rim at such distances apart as will secure the requisite strength to resist the shocks they are subject to as the machine runs along the ground.

Having thus described my invention, I claim as new and desire to secure by Letters Patent—

1. In a harvesting-machine, a combined revolving rake and reel provided with two or more rake-arms, in combination with an automatic variable gear-trip and mechanism under the control of the driver, whereby the trip may be set to act more or less frequently upon the rake-arms to regulate the size of the gavels by the driver while riding on the machine, substantially as described.

2. A combined revolving rake and reel provided with two or more rake-arms, in combination with a switch device to change the path of the rakes as they move over the platform, an automatic variable tripping device to operate the switch, and mechanism for adjusting said tripping device under the control of the driver, whereby the trip may be caused to operate the switch more or less frequently by the driver while riding on the machine, substantially as described.

3. A combined revolving rake and reel, in combination with a rake-tripping mechanism composed of two parts or devices, each of which is provided with one or more cams or projections, and one of which is adjustable for the purpose of varying the time of action, and mechanism under the control of the driver for adjusting the movable device, whereby different sets of cams or projections may be brought into action to trip the rake mechanism and vary the order of the operation of the rakes, substantially as described.

4. A combined revolving rake and reel, in combination with a variable rake-tripping mechanism composed of two parts or devices, each of which is provided with one or more cams or projections, and one of which is adjustable for the purpose of varying the time of action, a lever under the control of the driver for adjusting the movable device, and a locking device for the lever, whereby the tripping mechanism may be adjusted to vary its time of action and locked in its adjusted position, substantially as described.

5. A combined revolving rake and reel, in combination with rake-tripping devices under the control of the driver on the machine, whereby the rakes may be set automatically to discharge the gavels at any desired regular distance apart, or may be all caused to operate only as reel-arms, substantially as described.

6. A combined revolving rake and reel, in combination with a switch device for changing the path of the rakes, a tripping cam or cams for operating the switch, an adjustable wheel provided with two or more sets of cams or projections for actuating the tripping-cams, a lever under the control of the driver on the machine for moving said wheel, and a locking mechanism for fastening the lever in any position desired, whereby the cam-wheel may be adjusted at will to bring either set of cams into position to actuate the tripping-cams, or to remove them all out of position to operate the same, and may be locked in either adjustment, substantially as described.

JOHN L. OWENS.

Witnesses:
S. A. HUDSON,
S. HENRY HUDSON.